No. 624,845. Patented May 9, 1899.
J. A. MOSHER.
BICYCLE LAMP BRACKET.
(Application filed Sept. 6, 1898.)
(No Model.)
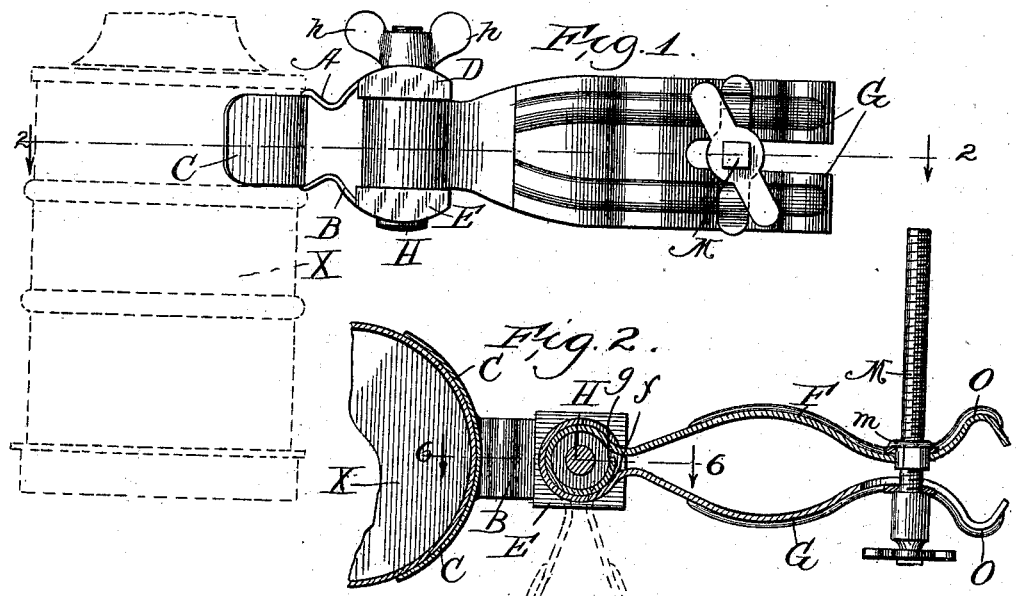
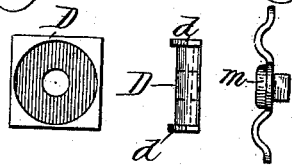
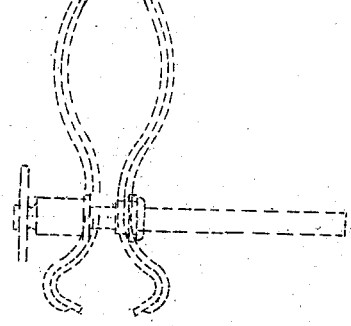
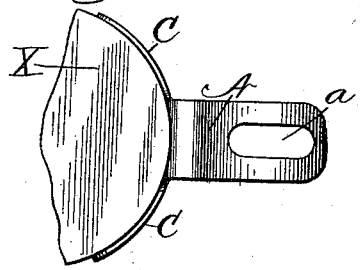
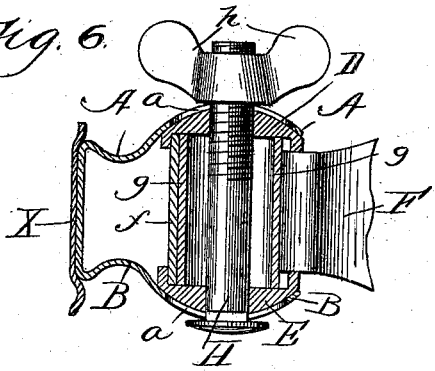
Witnesses:
Henry B. C. White
W. E. Cables
Inventor:
John A. Mosher
by Louis K. Gillson Atty.
THE NORRIS PETERS CO., PHOTO-LITHO., WASHINGTON, D. C.

UNITED STATES PATENT OFFICE.

JOHN A. MOSHER, OF CHICAGO, ILLINOIS.

BICYCLE-LAMP BRACKET.

SPECIFICATION forming part of Letters Patent No. 624,845, dated May 9, 1899.

Application filed September 6, 1898. Serial No. 690,287. (No model.)

*To all whom it may concern:*

Be it known that I, JOHN A. MOSHER, a citizen of the United States of America, and a resident of Chicago, county of Cook, and State of Illinois, have invented certain new and useful Improvements in Bicycle-Lamp Brackets, of which the following is a specification and which are fully illustrated in the accompanying drawings, forming a part thereof.

The objects of the invention are to provide a simple, cheap, and efficient bracket and one which will admit of the application of the lamp to different parts of a bicycle and to provide for the changing of the vertical and horizontal angular position of the lamp with reference to the bracket. These objects are attained by the construction hereinafter fully described, and illustrated in the accompanying drawings, in which—

Figure 1 is a side elevation of the bracket as attached to a lamp. Fig. 2 is a sectional view on the line 2 2 of Fig. 1, one of the positions of the bracket relatively to the lamp being indicated in dotted lines. Fig. 3 shows two views of the bearing-block used in the joint of the bracket. Fig. 4 is an elevation of the nut used in clamping the bracket to its support. Fig. 5 is a plan view of a portion of the bracket which is attached to the lamp; and Fig. 6 is a sectional view, upon an enlarged scale, taken on the line 6 6 of Fig. 2.

The bracket may be used in connection with any style of bicycle-lamp, a lamp-body being conventionally shown at X. A portion of the bracket which is attached to the lamp consists of a pair of segmental arms A B, projecting from and, as shown, being integral with a plate C, adapted to be secured to the lamp-body. The arms A B are of sheet metal, and the outer end of each is curved to the form of an arc of a circle, the two arcs being struck from a common center and being parts of the same circle. The extreme ends of the arms are spaced apart a considerable distance—as shown somewhat more than ninety degrees.

A pair of segmental bearing-blocks D E are adapted one to each of the curved portions of the arms A B, the adjacent faces of the blocks being parallel.

The attaching or clamping end of the bracket consists of a pair of arms F G, formed of sheet metal and arranged side by side, their inner ends being interfolded to form a round hub, as shown at $f\,g$, the circular portion of the arms being of sufficient width to fit snugly between the blocks D E and to enter and fit within circular recesses formed therein. The parts A B, D E, and $f\,g$ are clamped together by means of a bolt H passing therethrough, the arms A B being provided with longitudinal slots $a$ and the blocks D E being centrally apertured, a wing-nut $h$ being applied to the end of the bolt. The joint thus formed may be flexed laterally, as indicated in Fig. 2, by loosening the nut $h$, the circular ends $f\,g$ of the arms F G turning within the recesses of the blocks D E. The joint may be flexed so as to determine the angular position of the lamp by sliding the blocks D E within the curved portions of the arms A D. The joint is locked in any position to which it may be adjusted by turning up the nut $h$. The blocks D E are somewhat wider than the arms A B, and each is provided at each side with a radial guide-flange $d$. The shanks of the arms F G—that is to say, the portion forming the juncture of the body of these arms with their circular ends $f\,g$—are somewhat narrower than the circular portions, so as to permit the latter to enter the recesses in the blocks D E.

The arms F G are drawn together by means of a bolt M and a nut $m$, and they are given such configuration as to adapt them for engagement with the portions of the bicycle to which it is desired to apply them. As shown, the body portion of the arms are bowed outwardly, so that they may be applied to the steering-head of a bicycle, and the extreme ends of these arms are bent outwardly and sharply recurved inwardly, as indicated at O, to conform to the configuration of the front fork of a bicycle as now ordinarily made. It will be understood, of course, that these clamping-arms of the bracket may be varied in form to adapt them to any part to which it may be desired to attach the lamp.

I claim as my invention—

1. In a lamp-bracket, the combination with a pair of concentric segmental diametrically-opposed arms, of a pair of bearing-blocks fitted within the segmental arms, the inner faces of said blocks being parallel, and an attaching-arm having its inner end in the form of a round hub, the ends of the hub being adapted to the inner faces of the blocks, and means for securing the arm in pivotal engagement with the blocks.

2. In a lamp-bracket, the combination with a pair of concentric segmental slotted arms, of a pair of apertured bearing-blocks fitted within the segmental arms, the inner faces of said blocks being parallel and each having a circular recess, an attaching-arm having its end bent to form a round hub adapted to fit and turn within the recesses of the blocks, and a binding screw-bolt set through the segmental arms, the blocks, and the hub.

3. In a lamp-bracket, the combination with a pair of concentric segmental diametrically-opposed arms, of a pair of bearing-blocks fitted within the segmental arms, the inner faces of said blocks being parallel and each having a circular recess, and an attaching-arm having its end bent to form a round hub adapted to fit and turn within the recesses of the blocks.

4. In a lamp-bracket, in combination, a pair of arms curved about a point midway between them, and longitudinally slotted, a pair of centrally-apertured segmental bearing-blocks adapted to the curved arms and movable longitudinally therein, the adjacent faces of the blocks being parallel and having corresponding circular recesses, a pair of clamping-arms having their inner ends interfolded to form a round hub adapted to enter the recesses of the blocks, a screw-bolt for drawing the segmental arms together, and a screw-bolt for drawing the clamping-arms together.

JOHN A. MOSHER.

Witnesses:
LOUIS K. GILLSON,
PAUL SYNNESTVEDT.